(12) United States Patent
Uemura

(10) Patent No.: US 9,971,122 B2
(45) Date of Patent: May 15, 2018

(54) LENS BARREL AND IMAGE PICKUP APPARATUS

(71) Applicant: CANON KABUSHIKI KAISHA, Tokyo (JP)

(72) Inventor: Kohei Uemura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 135 days.

(21) Appl. No.: 14/836,123

(22) Filed: Aug. 26, 2015

(65) Prior Publication Data

US 2016/0062072 A1    Mar. 3, 2016

(30) Foreign Application Priority Data

Sep. 1, 2014   (JP) .................................. 2014-177156

(51) Int. Cl.
| | | |
|---|---|---|
| *G02B 7/00* | (2006.01) | |
| *G02B 7/02* | (2006.01) | |
| *H04N 5/225* | (2006.01) | |
| *H04N 5/232* | (2006.01) | |

(52) U.S. Cl.
CPC .............. *G02B 7/023* (2013.01); *G02B 7/003* (2013.01); *H04N 5/2254* (2013.01); *H04N 5/23293* (2013.01); *H04N 5/23296* (2013.01)

(58) Field of Classification Search
None
See application file for complete search history.

(56) References Cited

U.S. PATENT DOCUMENTS

| | | | | |
|---|---|---|---|---|
| 2002/0005997 A1* | 1/2002 | Oba | .......................... | G02B 7/04 359/819 |
| 2002/0012178 A1* | 1/2002 | Noguchi | ................ | G02B 7/102 359/811 |
| 2012/0105985 A1* | 5/2012 | Kang | ..................... | G02B 7/023 359/822 |

FOREIGN PATENT DOCUMENTS

JP        2010-066720 A       3/2010

\* cited by examiner

*Primary Examiner* — Ricky Mack
*Assistant Examiner* — Gary O'Neill
(74) *Attorney, Agent, or Firm* — Cowan, Liebowitz & Latman, P.C.

(57) ABSTRACT

A lens barrel that is capable of easily switching a state where a lens position is adjustable and a state where the lens position is not adjustable only by rotating a lens holding frame with respect to a support barrel. The lens holding frame holds a lens. The support barrel supports the lens holding frame at a first support position and a second support position that is reached by rotating the lens holding frame from the first support position around an optical axis with respect to the support barrel. The support barrel supports the lens holding frame so that the position of the lens is adjustable with respect to a reference axis at the first support position, and supports the lens holding frame so that the position of the lens is not adjustable with respect to the reference axis at the second support position.

5 Claims, 12 Drawing Sheets

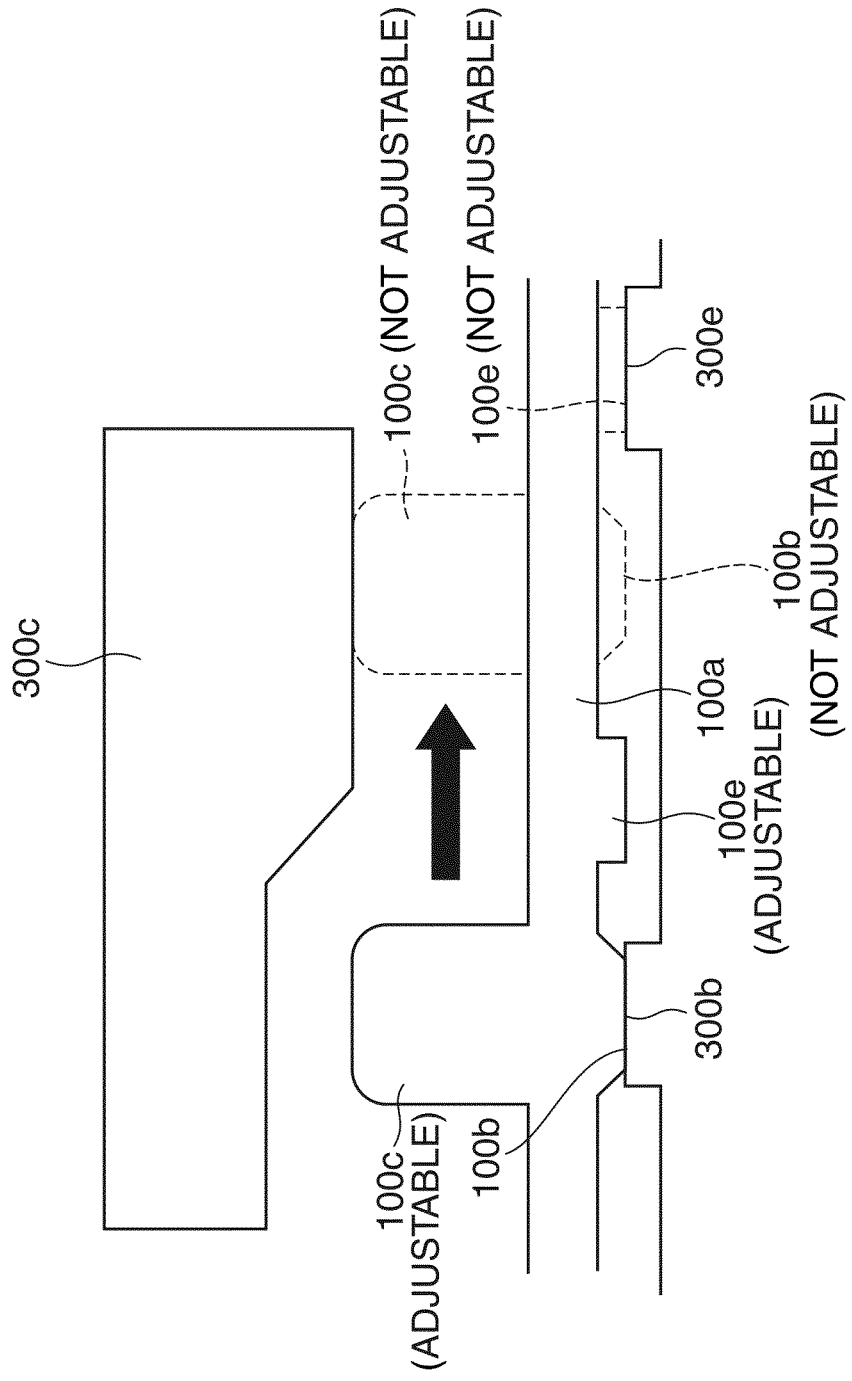

LENS BARREL AND IMAGE PICKUP APPARATUS

BACKGROUND OF THE INVENTION

Field of the Invention

The present invention relates to a lens barrel installed in an image pickup apparatus, such as a digital camera, a digital video camera, and relates to an image pickup apparatus equipped with the lens barrel.

Description of the Related Art

In an image pickup apparatus like a digital camera, a diameter of a lens group constituting a lens barrel increases as magnification increases in recent years. Particularly, a diameter of a lens arranged at the nearest side to an object among lens groups tends to become large. On the other hand, a demand of miniaturization of a digital camera etc. requires high accuracy of a lens position in order to satisfy high optical performance.

Moreover, since the improvement in accuracy of parts constituting a lens barrel or the improvement in performance of a lens is insufficient to satisfy the above-mentioned optical performance, the lens position is individually adjusted for each lens barrel. For example, an eccentricity adjustment and an inclination adjustment of a lens, or a tracking adjustment that adjusts a gap between adjacent lenses is performed (See Japanese Laid-Open Patent Publication (Kokai) No. 2010-66720 (JP 2010-66720A)).

Incidentally, since the lens position adjustment needs time and cost, the lens position adjustment may be stopped at a stage where the part accuracy and the lens position accuracy in a manufacturing process are stabilized. In this case, when the part accuracy or the lens position accuracy begins to vary after that, the lens position adjustment is needed again.

However, the technique disclosed in the above-mentioned publication needs filling up a gap for adjustment between a lens holding frame and an adjustment frame with adhesive to fix the lens holding frame even when the lens position is not adjusted. Accordingly, in the case where the lens position was not adjusted, it is difficult to adjust the lens position even if the accuracy of parts or the accuracy of the lens position varies after that.

SUMMARY OF THE INVENTION

The present invention provides a mechanism that easily switches a state where a lens position is adjustable and a state where the lens position is not adjustable only by rotating a lens holding frame with respect to a support barrel.

Accordingly, a first aspect of the present invention provides a lens barrel comprising a lens holding frame configured to hold a lens, and a support barrel configured to support the lens holding frame at a first support position and a second support position that is reached by rotating the lens holding frame from the first support position around an optical axis with respect to the support barrel. The support barrel supports the lens holding frame so that the position of the lens is adjustable with respect to a reference axis at the first support position, and supports the lens holding frame so that the position of the lens is not adjustable with respect to the reference axis at the second support position.

Accordingly, a second aspect of the present invention provides an image pickup apparatus with the lens barrel of the first aspect.

According to the present invention, the state where the lens position is adjustable and the state where the lens position is not adjustable are easily switched only by rotating the lens holding frame with respect to the support barrel.

Further features of the present invention will become apparent from the following description of exemplary embodiments with reference to the attached drawings.

BRIEF DESCRIPTION OF THE DRAWINGS

FIG. 13 is a schematic view showing a positional relationship among a projection of the lens holding frame at the first support position where the inclination of the adjustment lens is adjustable, the projection at the second support position where the inclination of the adjustment lens is not adjustable, and an adjustment-amount regulation rib of the support barrel.

DESCRIPTION OF THE EMBODIMENTS

Hereafter, embodiments according to the present invention will be described in detail with reference to the drawings.

Figure 1:
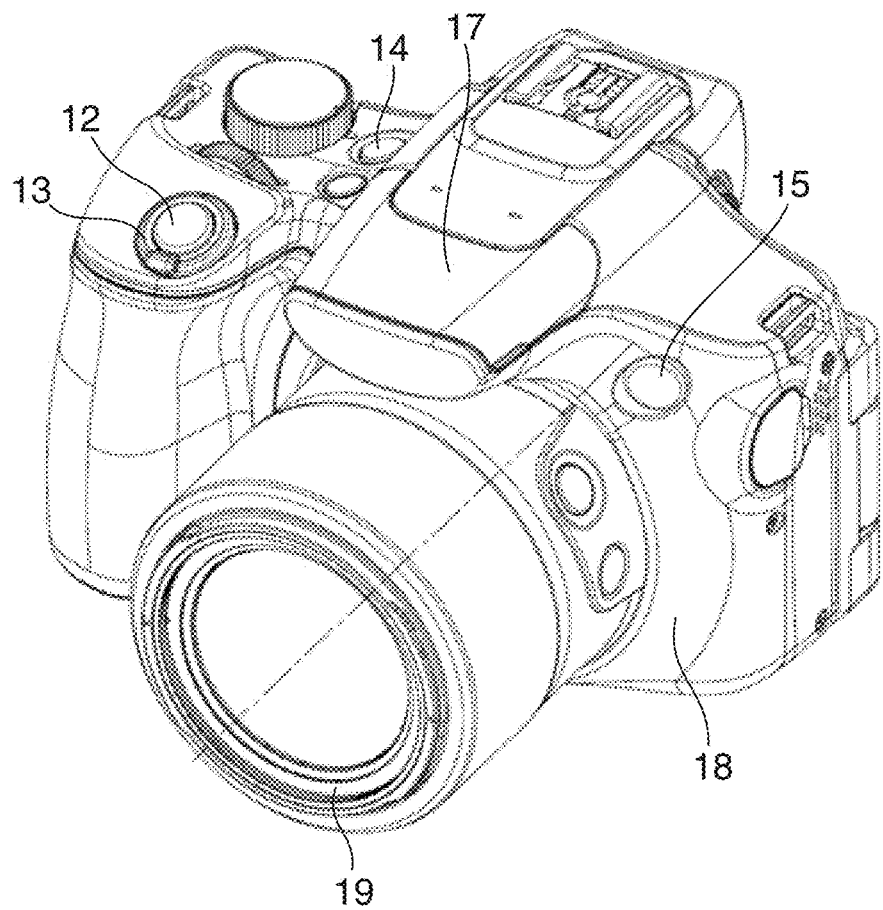
FIG. 1 is an external perspective view showing a digital camera viewed from a front side as an embodiment of an image pickup apparatus that is provided with a lens barrel according to the present invention.
Figure 2:
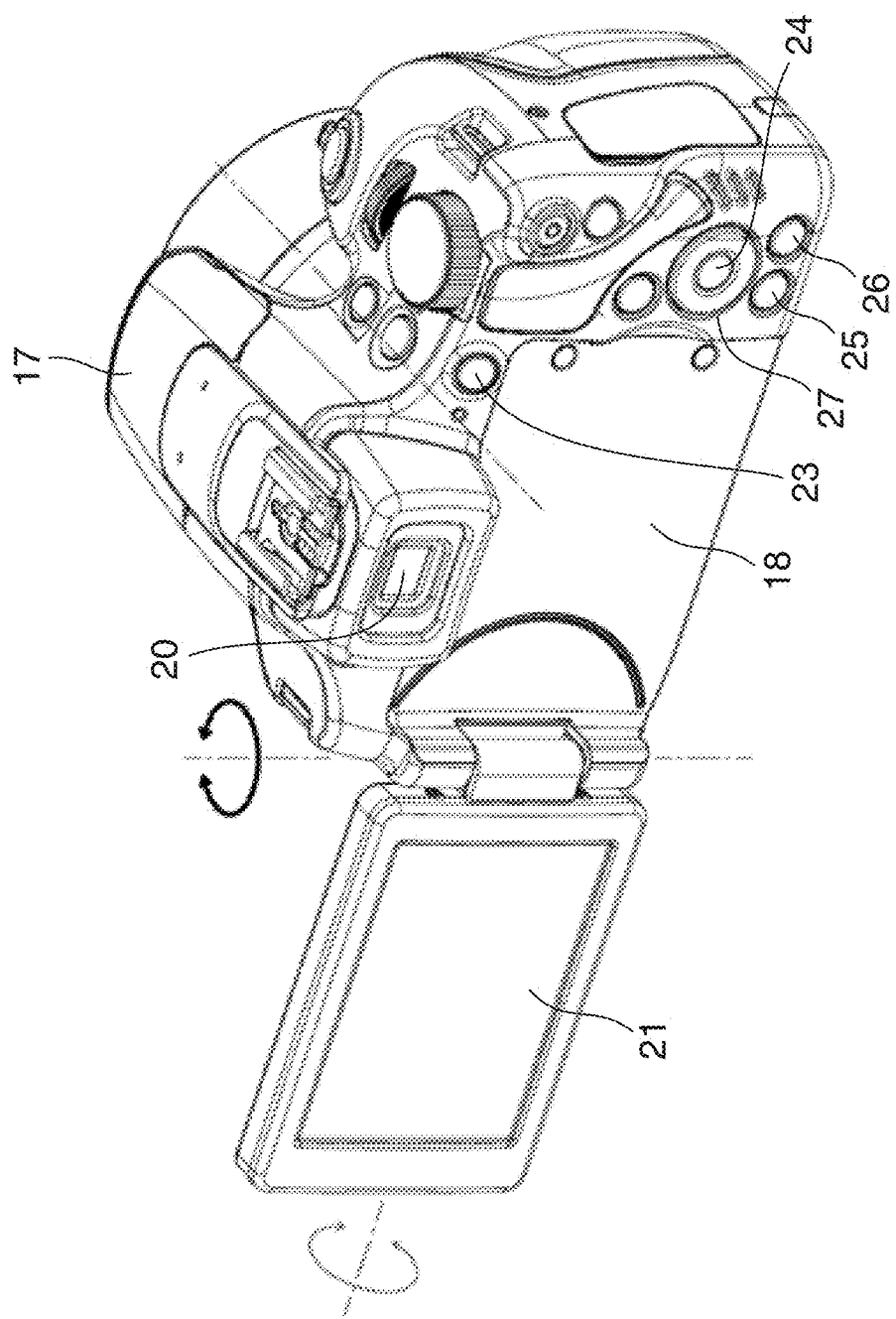
FIG. 2 is an external perspective view showing the digital camera shown in FIG. 1 viewed from a rear side.

FIG. 1 is an external perspective view showing a digital camera viewed from a front side as an embodiment of an image pickup apparatus that is provided with a lens barrel according to the present invention. FIG. 2 is an external perspective view showing the digital camera shown in FIG. 1 viewed from a rear side.

As shown in FIG. 1, the digital camera of this embodiment is provided with an auxiliary light window 15 and a lens barrel 19 in a front side of a camera body 18. The lens barrel 19 employs a zooming system that changes photographing magnification by moving at least a part of lens groups along an optical axis, and has a lens position adjustment mechanism mentioned later. A release button 12, a power button 14, a zoom lever 13, and a pop-up type electronic flash device 17 are disposed on a top surface of the camera body 18.

Moreover, as shown in FIG. 2, operation buttons 23 through 27, a display 21, such as an LCD, and a finder eyepiece 20 are disposed on a back side of the camera body 18. The display 21 is supported by the camera body 18 so as to be rotatable in an open-and-close direction and so as to be rotatable in an opened state.

Figure 3:
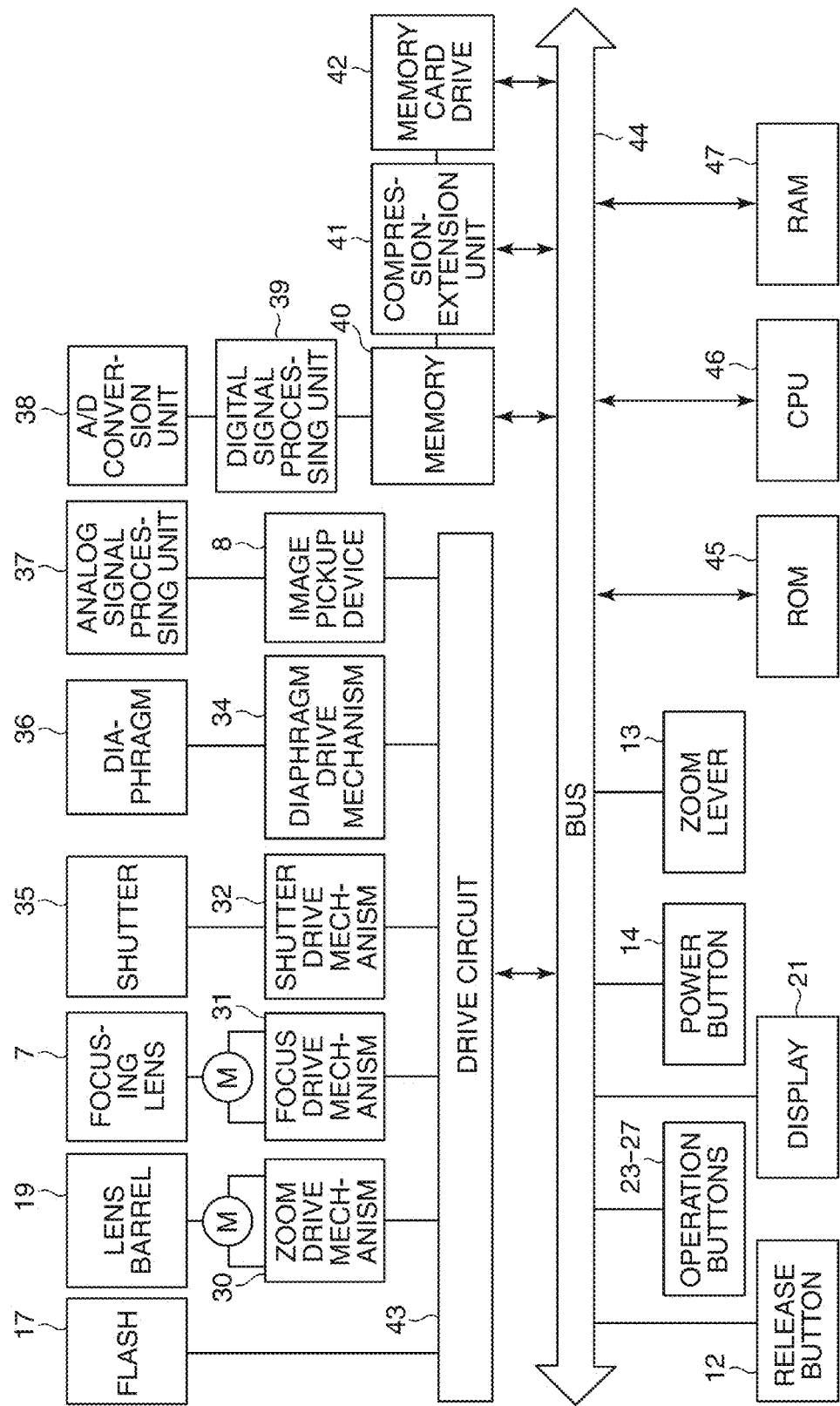
FIG. 3 is a block diagram schematically showing a control system of the digital camera shown in FIG. 1.

FIG. 3 is a block diagram schematically showing a control system of the digital camera shown in FIG. 1. A CPU 46, a ROM 45, a RAM 47, the release button 12, the operation buttons 23 through 27, the display 21, the power button 14, the zoom lever 13, a memory 40, a compression-extension unit 41, a memory card drive 42, and a drive circuit 43 are connected to a bus 44. Although electric switches operated by the buttons and the zoom lever are actually connected to the bus 44, the buttons and lever are illustrated instead in the description in FIG. 3.

A zoom drive mechanism 30 that drives the lens barrel 19 for zooming, a focus drive mechanism 31 that drives a focusing lens 7, a shutter drive mechanism that drives a shutter 35, and a diaphragm drive mechanism 34 that drives a diaphragm 36 are connected to the drive circuit 43. An image pickup device 8, such as a CCD sensor and a CMOS sensor, and the electronic flash device 17 are also connected to the drive circuit 43. Each unit connected to the drive circuit 43 is controlled based on the signal from the CPU 46 through the drive circuit 43.

The ROM 45 stores various control programs etc., and the RAM 47 stores data required of the various control programs. An analog signal processing unit 37 applies an analog process to the image data output from the image pickup device 8, and outputs the processed image data to an A/D conversion unit 38. The A/D conversion unit 38 converts the analog data captured from the image pickup device 8 into digital data, and outputs the converted data to a digital signal processing unit 39. The digital signal processing unit 39 applies a predetermined process to the digital data converted by the A/D conversion unit 38, and outputs it to the memory 40 as image data.

The compression-extension unit 41 applies a compression process like JPEG or TIFF to the image data stored in the memory 40 in response to an operation of the operation button 23. Then, the processed data is output and is stored into a memory card mounted on the memory card drive 42.

The compression-extension unit 41 applies an expansion process to the image data stored in the memory 40 or the image data stored in the memory card. Then, the processed image data can be displayed on the display 21 via the bus 44. When a user looks at the image displayed on the display 21 and determines that it is unnecessary, the user can erase the image data by operating the operation button 24.

Next, the lens position adjustment mechanism in the lens barrel 19 will be described with reference to FIG. 4 through FIG. 13.

Figure 4:
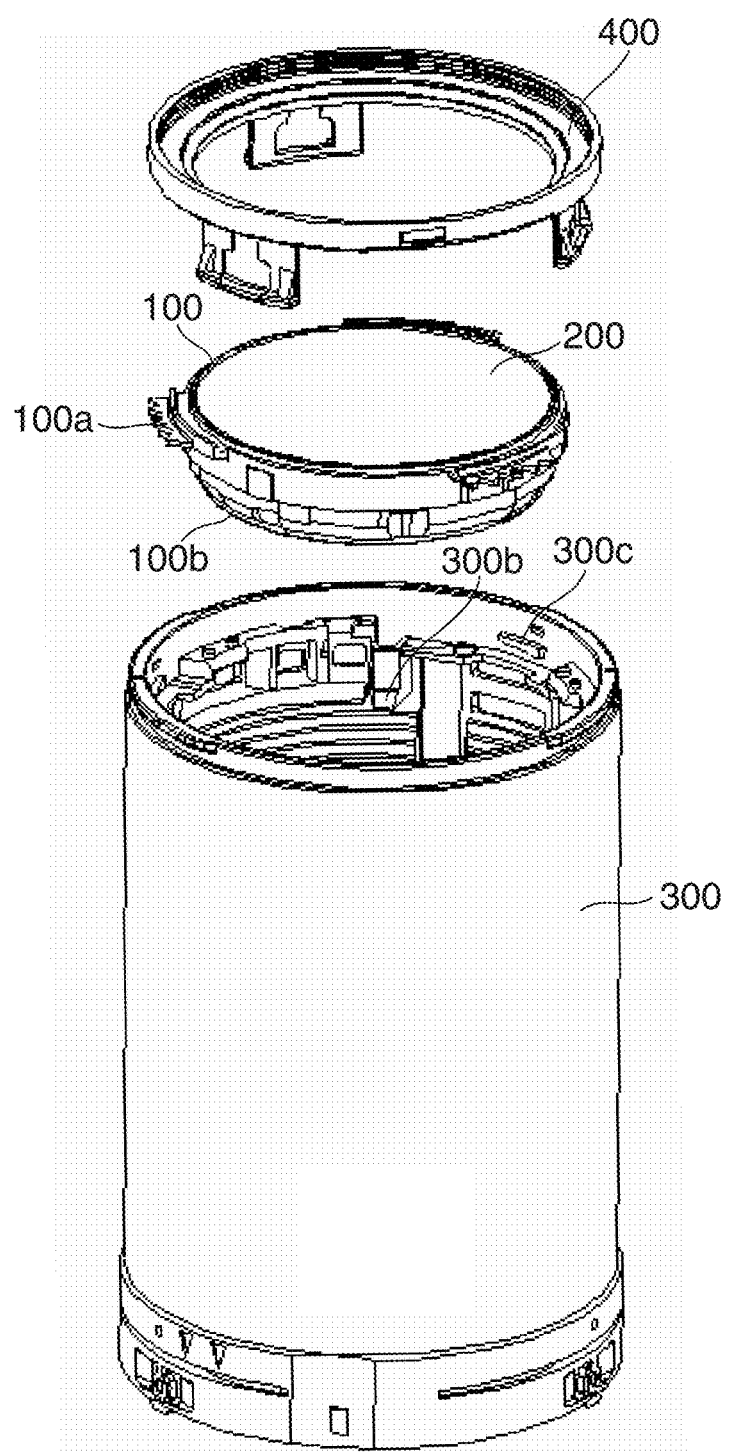
FIG. 4 is an exploded perspective view showing a lens position adjustment mechanism of the digital camera shown in FIG. 1.

FIG. 4 is an exploded perspective view showing a lens position adjustment mechanism of the digital camera shown in FIG. 1. As shown in FIG. 4, the lens position adjustment mechanism has a lens holding frame 100, a support barrel 300, and a cover unit 400. The lens holding frame 100 holds an adjustment lens 200. The support barrel 300 supports the lens holding frame 100 so that the position is adjustable. The cover unit 400 covers and protects an outer periphery of the lens holding frame 100 except the adjustment lens 200.

The support barrel 300 is connected to other lens groups and barrels (not shown), and constitutes the lens barrel 19 that consists of a plurality of lens groups. Moreover, the lens position adjustment mechanism in this embodiment adjusts a position of the adjustment lens 200 so as to satisfy optical accuracy by inclining the optical axis of the adjustment lens 200 with respect to a reference axis in accordance with the other lens groups (not shown) that constitute the lens barrel 19. It should be noted that the adjustment that inclines the optical axis of the adjustment lens 200 to the reference axis is described as inclination adjustment.

Figure 5A:
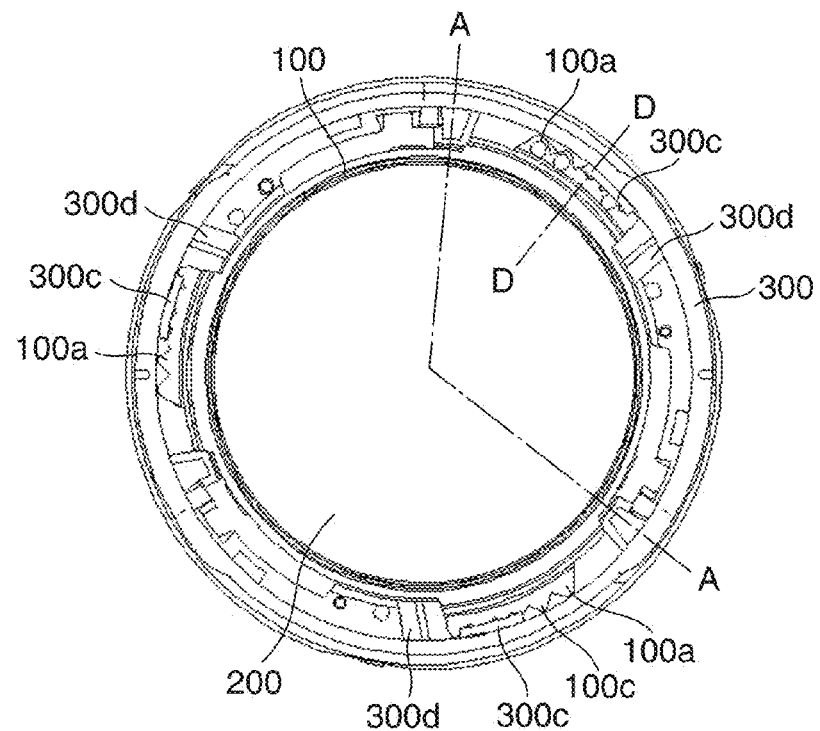
FIG. 5A is a front view of the lens position adjustment mechanism shown in FIG. 4 at a first support position where inclination of an adjustment lens is adjustable.
Figure 5B:
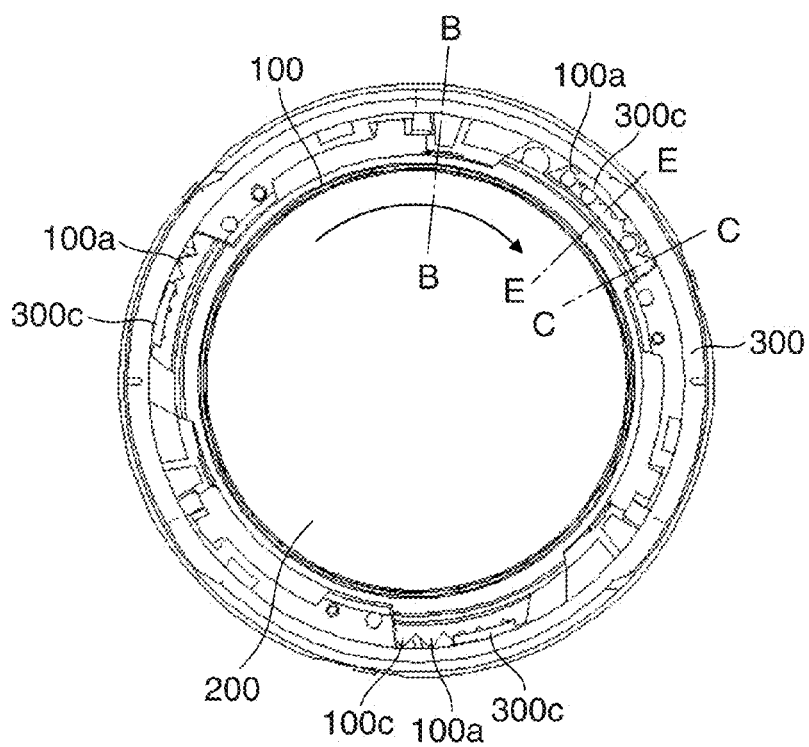
FIG. 5B is a front view of the lens position adjustment mechanism shown in FIG. 4 at a second support position where inclination of the adjustment lens is not adjustable.
Figure 6:
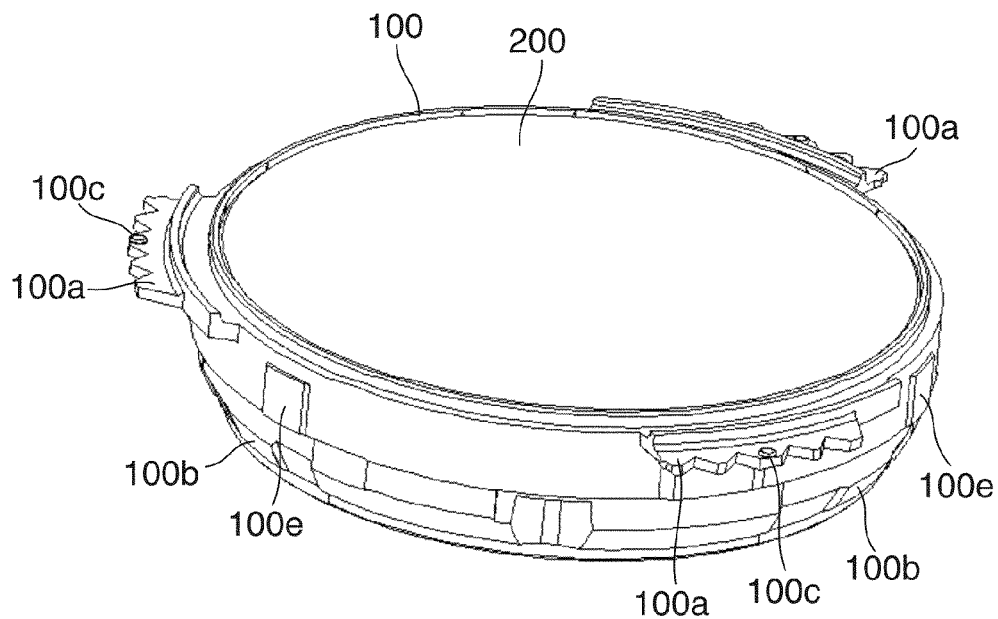
FIG. 6 is a perspective view showing a lens holding frame included in the lens position adjustment mechanism shown in FIG. 4 viewed from the front side.
Figure 7:
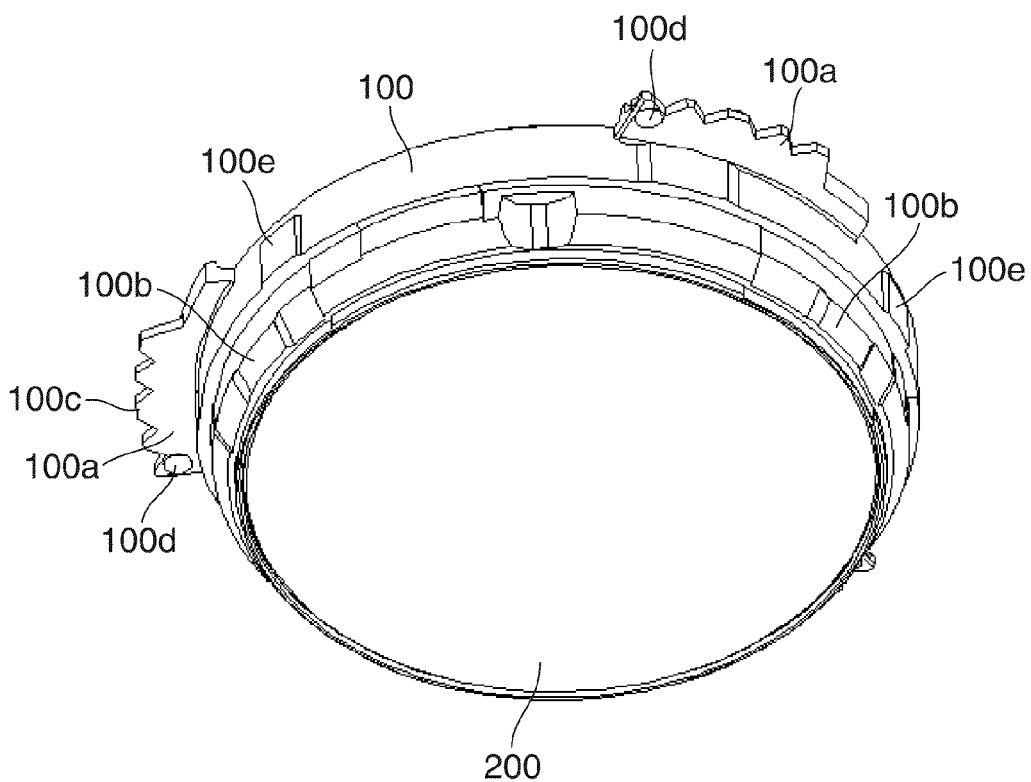
FIG. 7 is a perspective view showing the lens holding frame shown in FIG. 6 viewed from the rear side.
Figure 8:
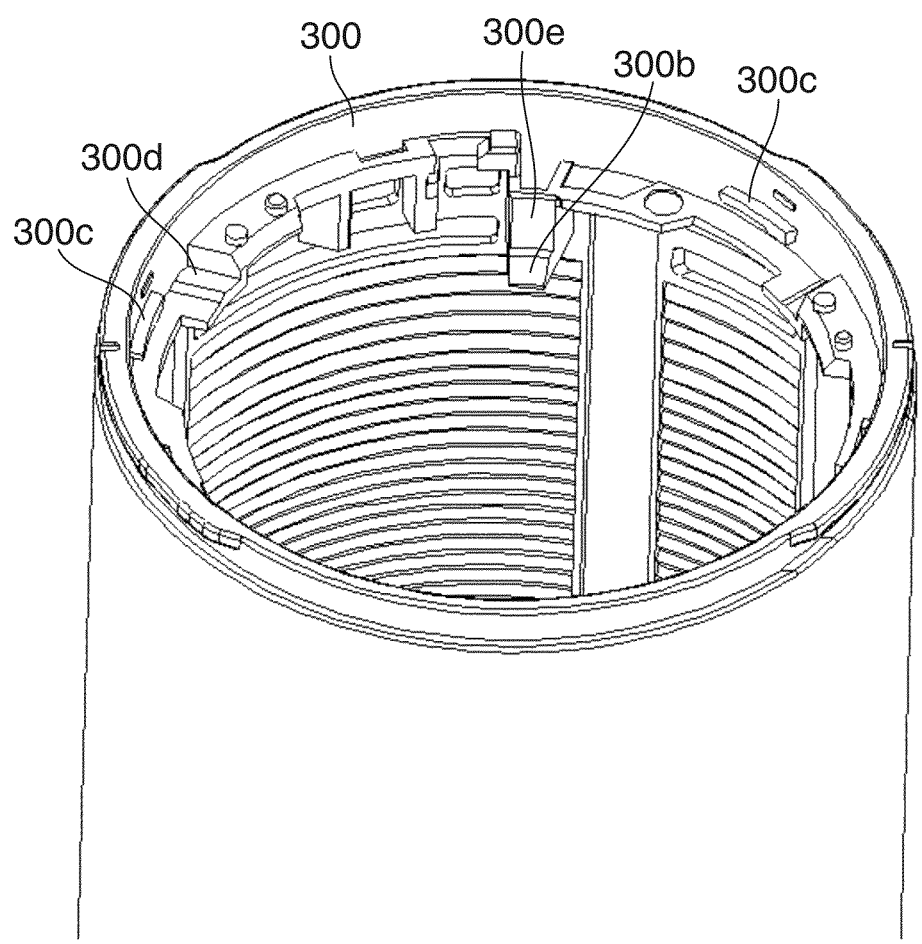
FIG. 8 is a perspective view showing a support barrel included in the lens position adjustment mechanism shown in FIG. 4 viewed from the front side.

FIG. 5A is a front view of the lens position adjustment mechanism in FIG. 4 at a position where inclination of the adjustment lens 200 is adjustable. FIG. 5B is a front view of the lens position adjustment mechanism in FIG. 4 at a position where inclination of the adjustment lens 200 is not adjustable. FIG. 6 is a perspective view showing the lens holding frame 100 viewed from the front side. FIG. 7 is a perspective view showing the lens holding frame 100 viewed from the rear side. FIG. 8 is a perspective view showing the support barrel 300 viewed from the front side.

The lens position adjustment mechanism is able to switch a first support position where the inclination adjustment of the adjustment lens 200 is performed and a second support position where the inclination adjustment is not performed by rotating the lens holding frame 100 with respect to the support barrel 300 around the optical axis, as shown in FIG. 5A and FIG. 5B.

As shown in FIG. 6 and FIG. 7, three flanges 100a projected outwardly in the radial direction are disposed at the outer periphery of the lens holding frame 100 at nearly regular intervals in the circumferential direction. A projection 100c is formed at the front end of the flange 100a, and a press contact portion 100d is formed in the back of the flange 100a.

Moreover, three adjusting surfaces 100b and three press contact portions 100e are disposed at the outer periphery of the lens holding frame 100 at nearly regular intervals in the circumferential direction, respectively. The adjusting surfaces 100b are respectively disposed apart from the press contact portions 100e in the optical axis direction. The adjusting surfaces 100b form parts of a spherical surface of which a center is located at the optimal point for the inclination adjustment of the adjustment lens 200.

As shown in FIG. 8, three adjustment receiving surfaces 300b, which support the lens holding frame 100 by coming into contact with the adjusting surfaces 100b of the lens holding frame 100, are formed in the inner periphery of the support barrel 300 at nearly regular intervals in the circumferential direction. Moreover, three adjustment-amount regulation ribs 300c, three press contact parts 300d, and three press contact portions 300e are formed in the inner periphery of the support barrel 300 at nearly regular intervals in the circumferential direction, respectively.

Figure 9:
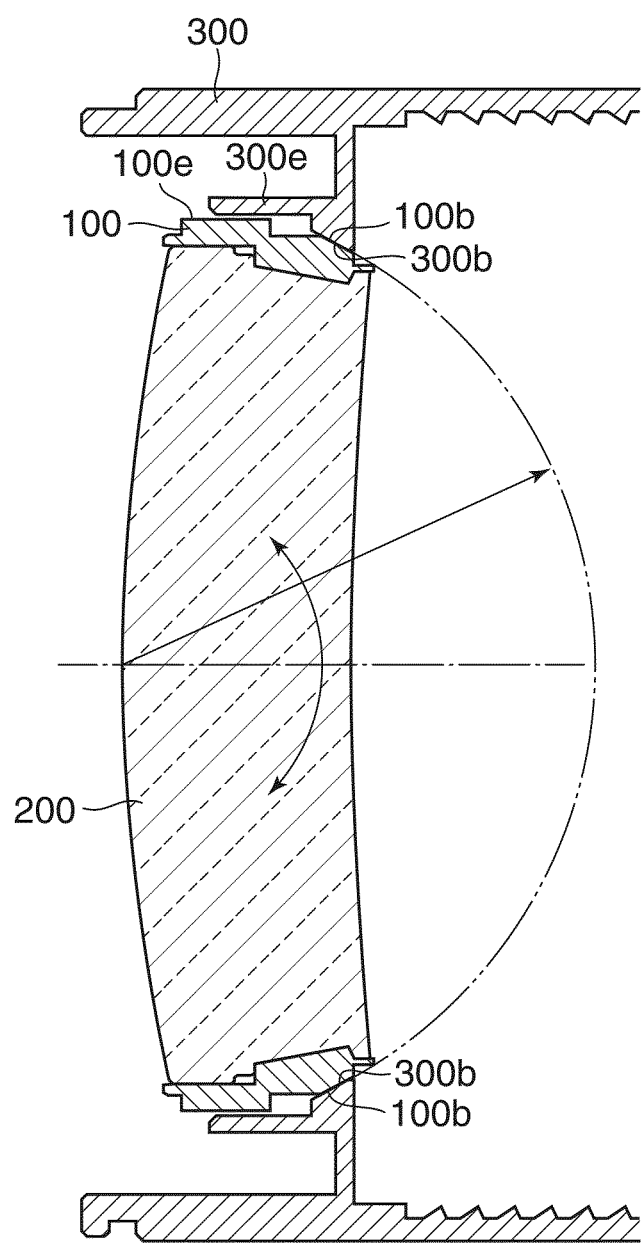
FIG. 9 is a sectional view taken along A-A line in FIG. 5A.
Figure 10:
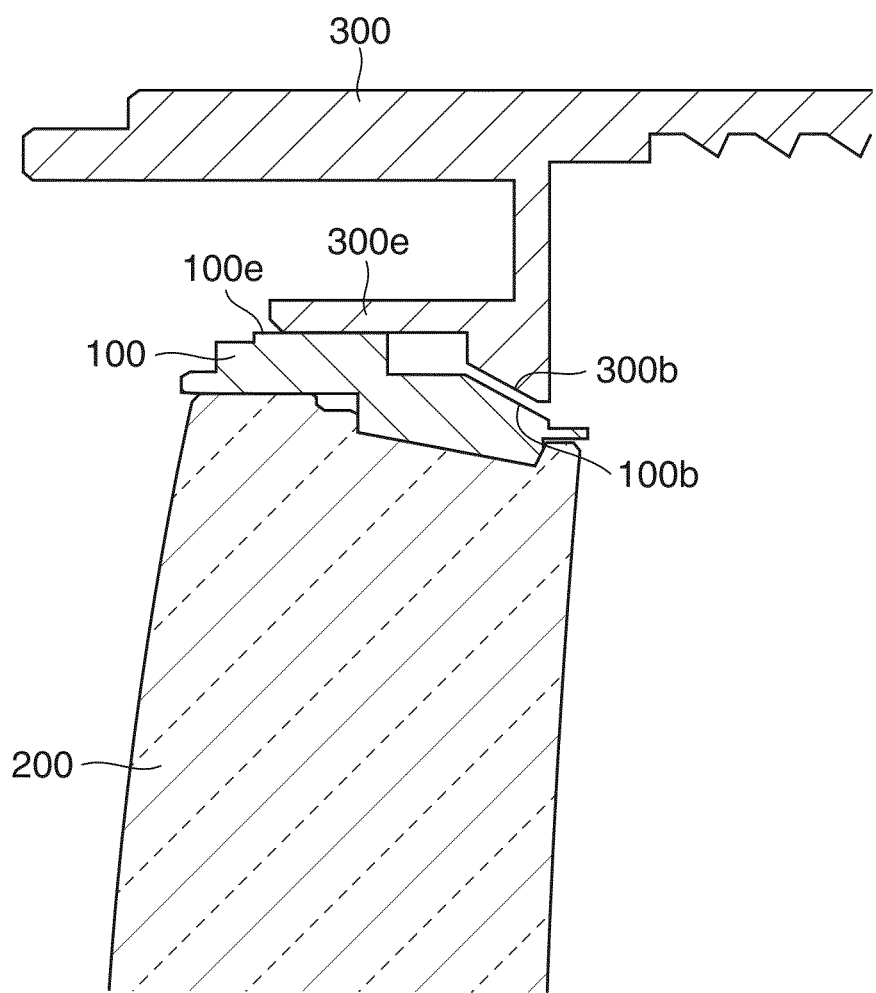
FIG. 10 is a sectional view taken along B-B line in FIG. 5B.
Figure 11:
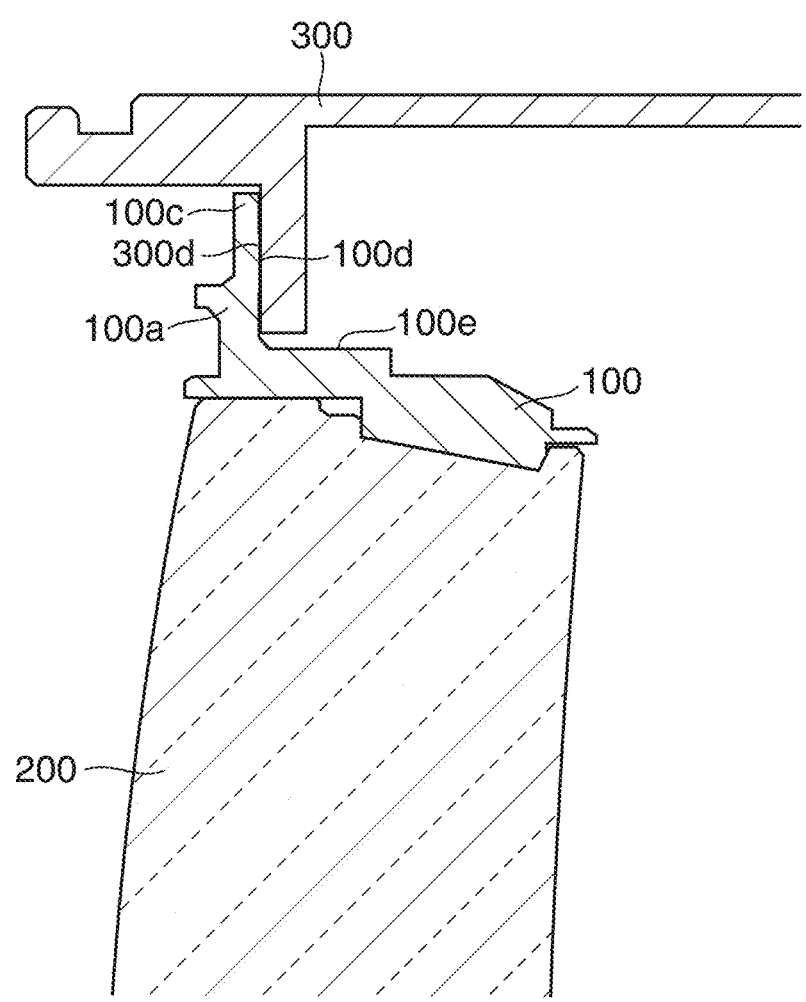
FIG. 11 is a sectional view taken along C-C line in FIG. 5B.
Figure 12A:
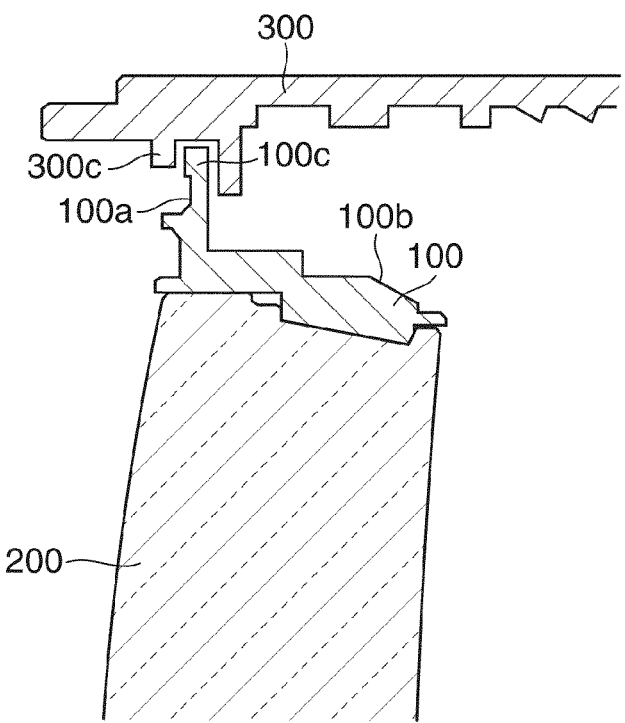
FIG. 12A is a sectional view taken along D-D line in FIG. 5A.
Figure 12B:
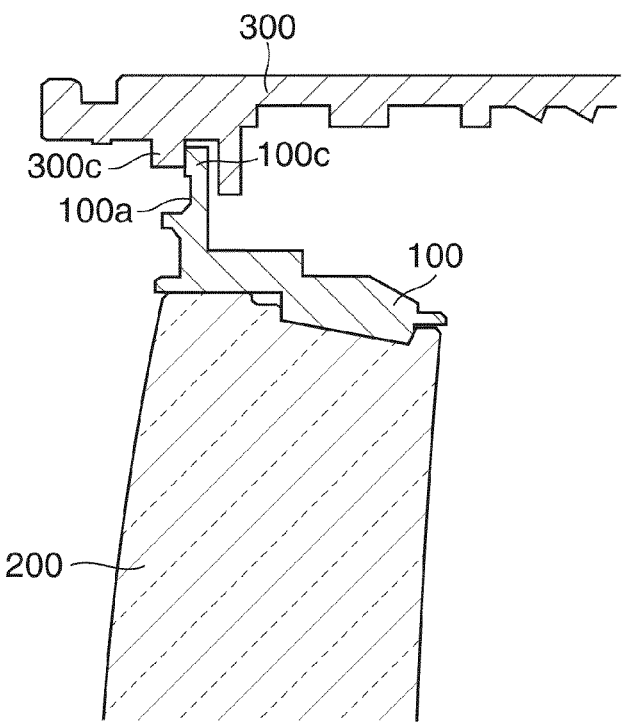
FIG. 12B is a sectional view taken along E-E line in FIG. 5B.

Next, an inclination adjustment operation of the adjustment lens 200 will be described with reference to FIG. 9 through FIG. 13. FIG. 9 is a sectional view taken along A-A line in FIG. 5A. FIG. 10 is a sectional view taken along B-B line in FIG. 5B. FIG. 11 is a sectional view taken along C-C line in FIG. 5B. FIG. 12A is a sectional view taken along D-D line in FIG. 5A, and FIG. 12B is a sectional view taken along E-E line in FIG. 5B. FIG. 13 is a schematic view showing a positional relationship among the projection 100c at the position where the inclination of the adjustment lens 200 is adjustable, the projection 100c at the position where the inclination of the adjustment lens 200 is not adjustable, and the adjustment-amount regulation rib 300c.

In the state shown in FIG. 9 that is a sectional view taken along A-A line in FIG. 5A, which is a first support position where the inclination of the adjustment lens 200 is adjustable, the adjusting surfaces 100b of the lens holding frame 100 come into contact with the adjustment receiving surfaces 300b of the support barrel 300. When the lens holding frame 100 is inclined in an arrow direction in FIG. 9 along the spherical surface shape of the adjusting surfaces 100b in this state, the inclination of the optical axis of the adjustment lens 200 is adjustable with respect to the reference axis.

At this time, as shown in FIG. 12A that is a sectional view taken along D-D line in FIG. 5A, a gap for adjustment in the optical axis direction appears between the projection 100c of the lens holding frame 100 and the adjustment-amount regulation rib 300c of the support barrel 300. The inclination adjustment is possible within the amount of this gap.

After the inclination adjustment is finished, the lens holding frame 100 is temporarily fixed using a tool etc. so that the lens holding frame 100 does not move with respect to the support barrel 300. And then, the lens holding frame 100 is permanently fixed to the support barrel 300 using UV cure adhesive etc. Since the adjusting surface 100b is in contact with the adjustment receiving surface 300b with a predetermined angle to the optical axis as shown in FIG. 9, the position of the lens holding frame 100 is regulated with respect to the support barrel 300.

On the other hand, when the position is switched from the first support position where the inclination of the adjustment lens 200 is adjustable to the second support position where the inclination is not adjustable, the lens holding frame 100 is rotated with respect to the support barrel 300 around the optical axis in the arrow direction in FIG. 5B. Thereby, the state shown in FIG. 9 is changed to the state shown in FIG. 10 that is a sectional view taken along B-B line in FIG. 5B.

In the state shown in FIG. 10, the adjusting surface 100b of the lens holding frame 100 comes away from the adjustment receiving surface 300b of the support barrel 300.

At this time, since the press contact portion 100e of the lens holding frame 100 is in contact with the press contact portion 300e of the support barrel 300 in a radial direction, the position of the lens holding frame 100 is regulated in the radial direction with respect to the support barrel 300. Moreover, since the press contact portion 100d of the lens holding frame 100 is in contact with the press contact portion 300d of the support barrel 300 in the optical axis direction as shown in the FIG. 11 that is a sectional view taken along C-C line in FIG. 5B, the position of the lens holding frame 100 is regulated in the optical axis direction with respect to the support barrel 300. Here, the press contact portion 100d and the press contact portion 300d are equivalent to an example of the first regulation mechanism of the present invention, and the press contact portion 100e and the press contact portion 300e are equivalent to an example of the second regulation mechanism of the present invention.

Moreover, since the inclination of the adjustment lens 200 is not adjusted in the second support position shown in FIG. 12B and shown by the broken line in FIG. 13, the gap for adjustment between the projection 100c of the lens holding frame 100 and the adjustment-amount regulation rib 300c of the support barrel 300 is set to zero. Since the gap for adjustment becomes zero, the lens holding frame 100 is temporarily fixed to the support barrel 300. Accordingly, when the lens holding frame 100 is permanently fixed with UV cure adhesive etc., it is unnecessary to temporarily fix the lens holding frame 100 using a tool etc.

Accordingly, the position of the lens holding frame 100 is regulated in the optical axis direction and the radial direction with respect to the support barrel 300 at the position where the inclination of the adjustment lens 200 is not adjusted. Moreover, since the gap for adjustment becomes zero, highly accurate registration is possible.

When the inclination of the adjustment lens 200 was not adjusted and the accuracy of parts or the accuracy of the lens position varied after that, the lens holding frame 100 is rotated in a direction opposite to the arrow in FIG. 5B with respect to the support barrel 300 before the permanent fixation mentioned above. Thereby, the inclination of the adjustment lens 200 becomes adjustable as mentioned above.

As mentioned above, according to the embodiment, the state where the position of the lens in the lens barrel 19 is adjustable and the state where the position is not adjustable are easily switched only by rotating the lens holding frame 100 with respect to the support barrel 300.

It should be noted that the present invention is not limited to what has been described in the above-mentioned embodiment, quality of the material, a shape, a size, a formation, the number of elements, arrangement locations, etc., can be changed suitably unless it is deviated from the scope of the present invention.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-177156, filed Sep. 1, 2014, which is hereby incorporated by reference herein in its entirety.

What is claimed is:

1. A lens barrel comprising:
a lens holding frame configured to hold a lens member having three adjusting surfaces at nearly regular intervals in an circumferential direction of the lens barrel;
a support barrel configured to support said lens holding frame at a first support position and a second support position that is reached by rotating said lens holding frame from the first support position around an optical axis with respect to said support barrel; and
three first regulation mechanisms, which are disposed, at nearly regular intervals in the circumferential direction, between said lens holding frame and said support barrel, configured to regulate the position of said lens holding frame in an optical axis direction with respect to said support barrel at the second support position,
wherein said support barrel supports said lens holding frame so that the position of the lens is adjustable with respect to a reference axis at the first support position, and supports said lens holding frame so that the position of the lens is not adjustable with respect to the reference axis at the second support position,
wherein said support barrel has three adjustment receiving surfaces, disposed at nearly regular intervals in a circumferential direction, which support said lens holding frame in association with the adjusting surfaces of the lens member at the first support position, and
wherein the three adjusting surfaces and the three first regulation mechanisms are arranged alternately in the circumferential direction, respectively, and the three adjustment receiving surfaces and the three first regulation mechanisms are arranged alternately in the circumferential direction, respectively.

2. The lens barrel according to claim 1, further comprising three second regulation mechanisms, which are disposed between said lens holding frame and said support barrel, configured to regulate the position of said lens holding frame in a radial direction of the lens barrel with respect to said support barrel at the second support position.

3. The lens barrel according to claim 1, wherein said support barrel supports said lens holding frame so that inclination of the lens member with respect to said support barrel is adjustable and so that a gap for adjusting the inclination appears in the optical axis direction between said lens holding frame and said support barrel at the first support position, and wherein said support barrel supports said lens holding frame so that the gap does not appear at the second support position.

4. An image pickup apparatus with a lens barrel, the lens barrel comprising:
a lens holding frame configured to hold a lens member having three adjusting surfaces at nearly regular intervals in an circumferential direction of the lens barrel;
a support barrel configured to support said lens holding frame at a first support position and a second support position that is reached by rotating said lens holding frame from the first support position around an optical axis with respect to said support barrel; and
three first regulation mechanisms, which are disposed, at nearly regular intervals in the circumferential direction, between said lens holding frame and said support barrel, configured to regulate the position of said lens holding frame in an optical axis direction with respect to said support barrel at the second support position,
wherein said support barrel supports said lens holding frame so that the position of the lens is adjustable with respect to a reference axis at the first support position, and supports said lens holding frame so that the position of the lens is not adjustable with respect to the reference axis at the second support position,
wherein said support barrel has three adjustment receiving surfaces, disposed at nearly regular intervals in a circumferential direction, which support said lens holding frame in association with the adjusting surfaces of the lens member at the first support position, and
wherein the three adjusting surfaces and the three first regulation mechanisms are arranged alternately in the circumferential direction, respectively, and the three adjustment receiving surfaces and the three first regulation mechanisms are arranged alternately in the circumferential direction, respectively.

5. The image pickup apparatus according to claim 4, wherein said support barrel supports said lens holding frame so that inclination of the lens member with respect to said support barrel is adjustable and so that a gap for adjusting the inclination appears in the optical axis direction between said lens holding frame and said support barrel at the first support position, and wherein said support barrel supports said lens holding frame so that the gap does not appear at the second support position.

* * * * *